(12) United States Patent
Hoye

(10) Patent No.: US 12,336,873 B1
(45) Date of Patent: Jun. 24, 2025

(54) DENTAL FLOSSING PICK WITH ATTACHED DENTAL FLOSS BANDS

(71) Applicant: Mary Ellen Hoye, Homer Glen, IL (US)

(72) Inventor: Mary Ellen Hoye, Homer Glen, IL (US)

( * ) Notice: Subject to any disclaimer, the term of this patent is extended or adjusted under 35 U.S.C. 154(b) by 405 days.

(21) Appl. No.: 17/994,241

(22) Filed: Nov. 25, 2022

(51) Int. Cl.
*A61C 15/04* (2006.01)
*A61C 15/02* (2006.01)

(52) U.S. Cl.
CPC ............ *A61C 15/046* (2013.01); *A61C 15/02* (2013.01); *A61C 2202/00* (2013.01)

(58) Field of Classification Search
CPC ..... A61C 15/046; A61C 15/02; A61C 15/045; A61C 2202/00
USPC .......................................................... 132/323
See application file for complete search history.

(56) References Cited

U.S. PATENT DOCUMENTS

| | | | | |
|---|---|---|---|---|
| 542,782 A * | 7/1895 | Simons | ............... | A61C 15/046 132/323 |
| 577,468 A * | 2/1897 | Tissington | ........... | A61C 15/046 132/323 |
| 1,570,357 A * | 1/1926 | Lawrenz | ............... | A61C 15/02 132/324 |
| 1,667,134 A * | 4/1928 | Sherwood | ........... | A61C 15/046 24/130 |
| 1,955,428 A * | 4/1934 | Ladwig | ............... | A61C 15/046 132/324 |
| 2,176,069 A * | 10/1939 | Goulet | ................. | A61C 15/046 132/327 |
| 2,492,291 A * | 12/1949 | Johnson | ............... | A61C 15/046 132/324 |
| 2,648,341 A * | 8/1953 | Moll | .................... | A61C 15/046 132/323 |
| 3,998,236 A * | 12/1976 | Koo | ...................... | A61C 15/046 132/324 |
| D268,955 S * | 5/1983 | Givens | ........................ | D28/66 |
| 4,434,806 A * | 3/1984 | Givens | ................. | A61C 15/046 132/323 |
| 4,460,002 A * | 7/1984 | Burdette, Jr. | ........ | A61C 15/046 132/323 |
| 4,729,392 A * | 3/1988 | Tenny | .................. | A61C 15/046 132/323 |
| 4,805,646 A * | 2/1989 | Shimenkov | ............ | A61C 15/02 132/321 |
| 4,913,176 A * | 4/1990 | DeNiro | .................. | A61C 15/02 433/80 |

(Continued)

FOREIGN PATENT DOCUMENTS

GB        2598595 A *  3/2022  ........... A61C 15/046

*Primary Examiner* — Jacqueline T Johanas
*Assistant Examiner* — Adriena J Webb Lyttle
(74) *Attorney, Agent, or Firm* — UNDERWOOD & ASSOCIATES, LLC

(57) ABSTRACT

A disposable, personal dental flossing device that includes a continuous or partially continuous band of floss attached near the nose of the device and spanning both the left and right sides of the device. A small protrusion pulls the floss away from the pick body toward the rear of the active part of the pick so that when the pick is inserted between two teeth and moved in and out, the floss is stretched inward like a bow string. The outward force pushes the floss into the small indentations and difficult to access areas as the device is moved, hence releasing trapped food particles.

7 Claims, 2 Drawing Sheets

(56) References Cited

U.S. PATENT DOCUMENTS

| | | | | |
|---|---|---|---|---|
| 5,495,863 A * | 3/1996 | Bergman | A61C 15/046 | 132/325 |
| 5,704,379 A * | 1/1998 | Krynicki | A61C 15/046 | 132/323 |
| 5,735,299 A * | 4/1998 | Kaltenbach | A61C 15/045 | 132/321 |
| 5,829,458 A * | 11/1998 | Chodorow | A61C 15/02 | 132/328 |
| 5,868,149 A * | 2/1999 | Yang | A61C 15/02 | 433/141 |
| 5,911,229 A * | 6/1999 | Chodorow | A61C 15/046 | 132/321 |
| 6,102,051 A * | 8/2000 | Neves | A61C 15/046 | 132/321 |
| 8,997,761 B1 * | 4/2015 | Mitchell | A46B 15/0071 | 15/105 |
| 9,844,431 B2 * | 12/2017 | Lam | A61C 15/046 | |
| 2002/0170570 A1 * | 11/2002 | Bergman | A61C 15/048 | 132/322 |
| 2005/0241665 A1 * | 11/2005 | Hill | A61C 15/046 | 132/323 |
| 2006/0127834 A1 * | 6/2006 | Szwajkowski | A61C 7/146 | 206/63.5 |
| 2007/0051386 A1 * | 3/2007 | Stelmach | A61C 15/046 | 132/323 |
| 2009/0151098 A1 * | 6/2009 | Wright | A46B 15/0071 | 15/105 |
| 2012/0080049 A1 * | 4/2012 | Liu | A61C 15/046 | 132/323 |
| 2012/0279518 A1 * | 11/2012 | Alas | A61C 15/02 | 132/324 |
| 2016/0038263 A1 * | 2/2016 | Chodorow | A61C 15/046 | 132/323 |
| 2016/0113744 A1 * | 4/2016 | Chodorow | B29C 69/005 | 264/138 |
| 2016/0302899 A1 * | 10/2016 | Honanian | A61C 15/046 | |
| 2017/0100222 A1 * | 4/2017 | Kalbfeld | A61C 15/02 | |
| 2018/0049852 A1 * | 2/2018 | Honanian | A61C 15/046 | |
| 2019/0328496 A1 * | 10/2019 | Massey | A61C 15/046 | |

* cited by examiner

DENTAL FLOSSING PICK WITH ATTACHED DENTAL FLOSS BANDS

BACKGROUND

Field of the Invention

The present invention relates generally to dental mouth hygiene, and more particularly to a dental pick with attached dental floss bands.

Description of the Problem Solved

It is well-known to dentists that people simply do not clean food debris from their teeth after eating, but rather elect to leave any cleaning or mouth hygiene task to brushing or hand flossing later. Even though, there are water-picks and other spray devices known in the art, people find them inconvenient to use outside the home, especially after eating at a restaurant. Most people find it socially unacceptable to floss in public, even at a bathroom sink. The result is a mass of food particles trapped between the teeth, sometimes for hours.

Even those who hand floss immediately after eating miss a considerable part of the trapped food. A major reason for this is that the areas between teeth are not just straight passages or canals; rather, they contain many crevices, notches, fillings and other irregularities that are very difficult to reach with a straight piece of floss thread. Getting to each crevice where food can be trapped with straight floss (even if mounted on a holder) is a very time-consuming task.

What is needed is a small, disposable device with mounted floss that will spring outward and force its way into crevices as it is moved in and out between teeth.

SUMMARY OF THE INVENTION

The present invention relates to a personal, disposable, hand-held flossing pick that includes an elongated narrow pick with a handle end and a pointed end. The pick has lateral protrusions on right and left sides, a lateral hole or slot passing through the pick near the pointed end, and a notch on the top surface near the handle end. A length of dental floss string passes from the notch on the top surface, around the protrusion on the left side, through the hole, around the protrusion on the right side and back to the notch where it can be tied off forming a continuous band.

The device operates so that the band of dental floss is pressed inward between the hole near the nose of the pick, and the protrusions on the left and right sides as the pick is inserted between a pair of teeth. This presents an outward force that causes the band of dental floss to clean crevices and irregularities between the pair of teeth.

DESCRIPTION OF THE FIGURES

Attention is now directed to several drawings that illustrate features of the present invention.

Several figures and illustrations have been provided to aid in understanding the present invention. The scope of the present invention is not limited to what is shown in the figures.

DESCRIPTION OF THE PREFERRED EMBODIMENTS

The present invention relates to a disposable, personal dental flossing device that includes a band of floss attached near the nose of the device and spanning both the left and right sides of the device. A small protrusion pulls the floss away from the pick body toward the rear of the active part of the pick so that when the pick is inserted between two teeth and moved in and out, the floss is stretched inward like a bow string. The outward force pushes the floss into the small crevices, indentations and other difficult to access areas as the device is moved, hence releasing trapped food particles. This occurs on each tooth pair as they are cleaned. A quick flush from a glass of water, or the like, can remove most of the food particles from the mouth since the particles are no longer trapped. The device can also be optionally rinsed as the region between each tooth pair is cleaned. When done, the device can be discarded. Since the devices can be supplied in packages (which optionally can be sterile), they are convenient to carry in a purse, wallet or even small bag.

Figure 1A:
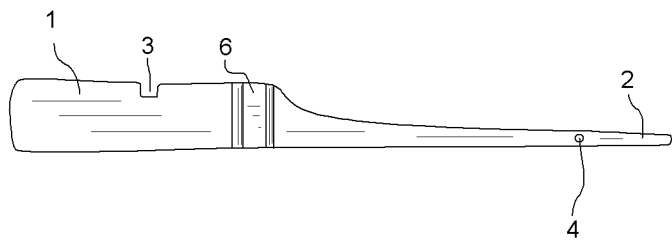
FIG. 1A shows a side view of an embodiment of the present invention without dental floss mounted
Figure 1B:
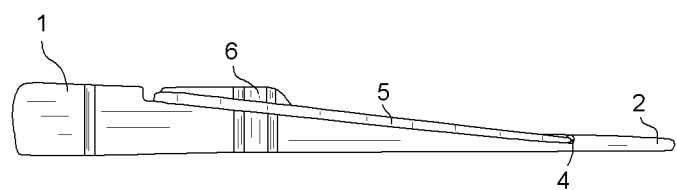
FIG. 1B shows a side view of the embodiment of FIG. 1A with floss mounted.

Turning to FIG. 1A, a side view of an embodiment of the present invention can be seen without the floss installed. FIG. 1B shows the embodiment of FIG. 1A with the floss. The device has a handle 1 and a nose 2. A small hole 4 can be made in the device toward the front of the device. A notch 3 appears on the top of the device. A protrusion 6 is attached to the side of the device at the beginning of the active region. FIG. 1B shows the same device of FIG. 1A with a strip of floss 5 mounted between the hole 4 and the notch 3.

Figure 2A:
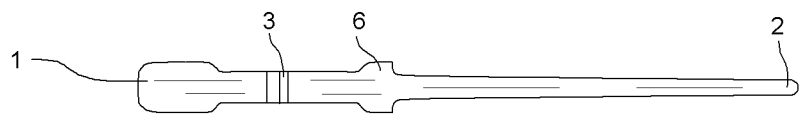
FIG. 2A shows a top view of the embodiment of FIG. 1A without floss mounted.
Figure 2B:
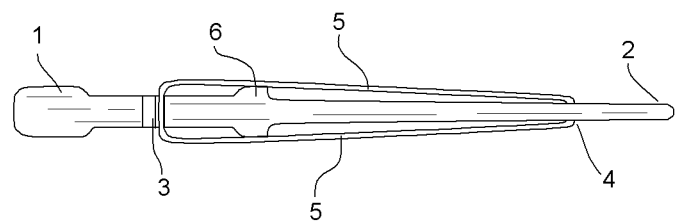
FIG. 2B shows a top view of the embodiment of FIG. 1B with floss mounted.

FIGS. 2A-2B show top views of the embodiment from FIGS. 1A-1B. In FIG. 2A, the protrusion 6 can be clearly seen. FIG. 2B shows the top view with the floss 5 mounted. It can be seen that between the hole 4 and the protrusion 6 the floss will be pushed inward as it encounters the sides of the teeth when it is moved in and out. The outward force on the floss 5 forces it into indentations and notches and the like between the teeth. As can be seen in FIGS. 2A and 2B, the floss 5 makes a continuous band from hole 4, past the protrusion 6 and through the notch 3. The floss can be optionally tied off in the slot 3 or elsewhere to ease production.

The pick can be plastic or other semi-rigid material. The length of floss can form a continuous band (welded at either the notch or the hole or slot), or it can simple be tied-off at one of these points, or other convenient point during manufacture.

The device is cheap, disposable, easy to carry and easy to use. A user at a restaurant for example, can floss with one or more of the devices in a restroom stall out of view for a quick, but thorough floss cleaning thus removing the bulk of trapped food particles.

Several descriptions and illustrations have been presented to aid in understanding the present invention. One with skill in the art will realize that numerous changes and variations may be made without departing from the spirit of the invention. Each of these changes and variations is within the scope of the present invention.

I claim:

1. A personal, disposable, hand-held flossing pick comprising:

an elongated narrow dental pick with top and bottom surfaces, left and right sides, a proximal end and a distal end;

the pick having a handle portion on the proximal end and a point on the distal end; the pick having lateral protrusions on right and left sides, a lateral hole passing through the pick near the distal end, and a notch on the top surface near the proximal end;

a band of dental floss passing from the notch on the top surface, around the protrusion on the left side, through the hole, around the protrusion on the right side and back to the notch;

whereby, the band of dental floss is pressed inward between the hole and the protrusions on the left and right sides as the pick is inserted between a pair of adjacent teeth, presenting an outward biasing force causing the band of dental floss to clean into tooth canals and irregularities between the pair of adjacent teeth.

2. The personal, disposable, hand-held flossing pick of claim 1, wherein the band of dental floss is cut and tied-off in the notch.

3. The personal, disposable, hand-held flossing pick of claim 1, wherein the band of dental floss is cut and tied-off in the hole.

4. The personal, disposable, hand-held flossing pick of claim 1, wherein the pick is plastic.

5. The personal, disposable, hand-held flossing pick of claim 1, wherein the pick is supplied in a package.

6. The personal, disposable, hand-held flossing pick of claim 5, wherein the package is sterile before opening.

7. A dental flossing pick comprising:

an elongated narrow dental pick with top and bottom surfaces, left and right sides, a proximal end and a distal end;

the pick having a handle portion on the proximal end and a point on the distal end; the pick having lateral protrusions on right and left sides, a lateral hole or slot passing through the pick near the distal end, and a notch on the top surface near the proximal end;

a band of floss passing from the notch on the top surface, around the protrusion on the left side, through the hole or slot, around the protrusion on the right side and back to the notch;

wherein, the notch, protrusions and hole or slot are configured to cooperate to cause the band of floss to curve inward exerting an outward bias on the floss forcing the floss into irregularities in teeth when the pick is inserted between two adjacent teeth.

\* \* \* \* \*